US011893132B2

(12) United States Patent
Goldsteen et al.

(10) Patent No.: US 11,893,132 B2
(45) Date of Patent: Feb. 6, 2024

(54) DISCOVERY OF PERSONAL DATA IN MACHINE LEARNING MODELS

(71) Applicant: INTERNATIONAL BUSINESS MACHINES CORPORATION, Armonk, NY (US)

(72) Inventors: Abigail Goldsteen, Haifa (IL); Micha Gideon Moffie, Zichron Yaakov (IL); Ariel Farkash, Shimshit (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

(21) Appl. No.: 17/182,271

(22) Filed: Feb. 23, 2021

(65) Prior Publication Data

US 2022/0269814 A1 Aug. 25, 2022

(51) Int. Cl.
| G06F 21/62 | (2013.01) |
| G06N 5/04 | (2023.01) |
| G06N 20/00 | (2019.01) |
| G06F 16/28 | (2019.01) |

(52) U.S. Cl.
CPC ........ *G06F 21/6245* (2013.01); *G06F 16/285* (2019.01); *G06N 5/04* (2013.01); *G06N 20/00* (2019.01)

(58) Field of Classification Search
CPC ..... G06F 21/6245; G06F 16/28; G06N 20/00; G06N 5/04; G06N 5/042; G06N 5/045
See application file for complete search history.

(56) References Cited

U.S. PATENT DOCUMENTS

| 8,239,335 B2 | 8/2012 | Schmidtler |
| 8,838,606 B1 | 9/2014 | Cormack |

(Continued)

FOREIGN PATENT DOCUMENTS

WO 2020142110 A1 7/2020

OTHER PUBLICATIONS

Al-Rubaie et al., "Privacy Preserving Machine Learning: Threats and Solutions," 2018, IEEE, Retrieved from the Internet: <https://arxiv.org/ftp/arxiv/papers/1804/1804.11238.pdf>, 18 pages.

(Continued)

*Primary Examiner* — Olugbenga O Idowu
(74) *Attorney, Agent, or Firm* — Rakesh Roy (57) ABSTRACT

A method, computer system, and a computer program product for personal data discovery is provided. The present invention may include determining at least one feature used to train a target machine learning (ML) model. The present invention may also include mapping the determined at least one feature to at least one location of a data store including at least one personal data associated with the determined at least one feature. The present invention may further include retrieving a data record of the at least one personal data associated with the mapped at least one feature from the at least one location of the data store. The present invention may also include determining that the target ML model includes a trace of the retrieved data record. The present invention may further include marking the target ML model as containing the at least one personal data.

20 Claims, 6 Drawing Sheets

(56) References Cited

U.S. PATENT DOCUMENTS

2020/0082259 A1 3/2020 Gu
2021/0360010 A1* 11/2021 Zaccak ............... G06N 20/20

OTHER PUBLICATIONS

Farokhi et al., "Modelling and Quantifying Membership Information Leakage in Machine Learning," arXiv:2001.10648v2 [cs.LG] Apr. 28, 2020, Retrieved from the Internet: <https://arxiv.org/pdf/2001.10648v2.pdf>, 13 bages.

Fredrikson et al., "Model Inversion Attacks that Exploit Confidence Information and Basic Countermeasures," CCS 15: Proceedings of the 22nd ACM SIGSAC Conference on Computer and Communications Security, Oct. 2015, pp. 1322-1333, Retrieved from the Internet: <https://doi.org/10.1145/2810103.2813677>.

Fredrikson et al., "Privacy in Pharmacogenetics: An End-to-End Case Study of Personalized Warfarin Dosing," Proceedings of the 23rd USENIX Security Symposium, Aug. 20-22, 2014, San Diego, CA, ISBN 978-1-931971-15-7, pp. 17-32.

Long et al., "Towards Measuring Membership Privacy," arXiv: 1712.09136v1 [cs.CR] Dec. 25, 2017, Retrieved from the Internet: <https://arxiv.org/pdf/1712.09136.pdf>, 18 pages.

Mell et al., "The NIST Definition of Cloud Computing", National Institute of Standards and Technology, Special Publication 800-145, Sep. 2011, 7 pages.

Salem et al., "ML-Leaks: Model and Data Independent Membership Inference Attacks and Defenses on Machine Learning Models,"Network and Distributed Systems Security (NDSS) Symposium 2019 Feb. 24-27, 2019, arXiv: 1806.01246v2 [cs.CR] Dec. 14, 2018, Retrieved from the Internet: <https://arxiv.org/pdf/1806.01246.pdf>, 15 pages.

Shokri et al., "Membership Inference Attacks Against Machine Learning Models," arXiv: 1610.05820v2 [cs.CR] Mar. 31, 2017, Retrieved from the Internet: <https://arxiv.org/pdf/1610.05820.pdf>, 16 pages.

Veale et al., "Algorithms that Remember: model inversion attacks and data protection law," 2018, Phil. Trans. R. Soc. A 376: 20180083, http://dx.doi.org/10.1098/rsta.2018.0083, 15 pages.

Yunhui Long, "Understanding and Mitigating Privacy Risk in Machine Learning Systems," Dissertation, 2020-05-04, Retrieved from the Internet: <https://www.ideals.illinois.edu/bitstream/handle/2142/107972/LONG-DISSERTATION-2020.pdf?sequence=1&isAllowed=y>, 156 pages.

* cited by examiner

DISCOVERY OF PERSONAL DATA IN MACHINE LEARNING MODELS

BACKGROUND

The present invention relates generally to the field of computing, and more particularly to data security.

The General Data Protection Regulation (GDPR) set forth under European Union law includes many restrictions on the processing of personal data, as well as many obligations on companies that collect and process personal information. Similarly, the California Consumer Protection Act (CCPA) sets out several consumer rights in relation to personal information being collected about them by businesses. Similar laws and regulations are in the process of being enacted in the United States and additional countries worldwide. Adhering to these regulations can be a complex and costly task.

SUMMARY

Embodiments of the present invention disclose a method, computer system, and a computer program product for personal data discovery. The present invention may include determining a feature used to train a target machine learning (ML) model. The present invention may also include mapping the determined feature to a location of a data store including at least one personal data associated with the determined feature. The present invention may further include retrieving a data record corresponding to the mapped feature from the location of the data store. The present invention may also include applying an adversarial inference attack on the target ML model using the retrieved data record. The present invention may also include calculating a membership leakage value to determine an amount of personal data contained within the target ML model. The present invention may further include determining that the target ML model includes a trace of the retrieved data record. The present invention may also include marking the target ML model as containing the at least one personal data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for discovering personal data in machine learning (ML) models. As such, the present embodiment has the capacity to improve the technical field of data security by determining whether a target ML model contains and/or leaks personal data. More specifically, a data discovery program may locate personal data stored in structured and unstructured data stores such as, for example, relational databases and documents. This process may include analyzing the data itself, as well as the metadata, and in some embodiments, employing supervised or unsupervised ML techniques to determine the type and location of each personal data element. The data discovery program may then take additional steps to determine if the personal data located in the data stores is contained within a target ML model, such as, for example, an ML model deployed by an organization. The data discovery program may implement adversarial techniques and/or membership leakage metrics on the target ML model to determine whether the target ML model contains and/or leaks the personal data records discovered in the data stores.

As described previously, the GDPR set forth under European Union law includes many restrictions on the processing of personal data, as well as many obligations on companies that collect and process personal information. Similarly, the CCPA sets out several consumer rights in relation to personal information being collected about them by businesses. Similar laws and regulations are in the process of being enacted in the United States and additional countries worldwide. Adhering to these regulations can be a complex and costly task.

The first step to adhering to such regulations is knowing where personal data resides in the organization in order to manage and protect it. In addition to an organization's data stores, ML models deployed by the organization may also contain personal information. Recent studies have shown that a malicious third-party with access to a trained ML model, even without access to the training data itself, can still reveal sensitive, personal information about the people whose data was used to train the model. Moreover, the recently published study of the European Parliamentary Research Service (EPRS) on the impact of the GDPR on artificial intelligence (AI) found that, although AI is not explicitly mentioned in the GPDR, many provisions in the GDPR are relevant to AI.

GDPR compliance in the AI era is a complicated topic that all data processing organizations are facing and will continue to face in the coming years. The process of identifying sensitive/personal data is a necessary step to meeting GDPR regulations. Once the sensitive data has been identified, organizations can provide their customers/users the ability to control their personal data (delete, modify, provide permissions, etc.). It is contemplated that the addition of considering ML models during the data classification process may be extremely useful and will be requested by many customers.

Therefore, it may be advantageous to, among other things, provide a way to detect the existence of personal data or information within a target ML model based on adversarial attacks and/or membership leakage metrics that are capable of determining whether the personal data was part of a training dataset for the target ML model and inferring further sensitive information from the target ML model.

According to at least one embodiment, in an initial phase, one or more data discovery tools may be applied to find where personal data may be located within an organization's structured and unstructured data stores. This may include analyzing the data itself, as well as the metadata, and in some embodiments, employing supervised or unsupervised ML techniques to determine the type and location of each personal data element. At the end of the initial process, each personal data feature may be mapped to the difference locations in the data stores where the information is stored. Then each ML model (e.g., target ML model) of the organization may be analyzed to determine and extract the features that were used to train the ML model. Next, the locations of all those features (e.g., database columns/documents) are determined based on the results of the initial phase of data discovery and classification. Then, the actual data records for those features may be extracted from the data stores/documents. Next, each record may be used to try to attack the target ML model. Various adversarial attacks may be implemented to infer sensitive information from trained models. One example of an adversarial attack may include a membership inference attack, where the attacker can deduce whether a specific personal record was part of the training dataset for the target ML model. Another example may include a model inversion attack, also referred to as an attribute inference attack, where certain sensitive features may be inferred about individuals who participated in training the target ML model. In addition a few metrics/measures may be implemented to quantify the amount of personal data leakage the target ML model. Any model that may be found to have a high leakage and/or for which the inference attacks are successful may be marked as containing personal data. In addition to marking the target ML model as containing personal data, in one embodiment, the output of the target ML model (if it is also stored) may also be marked as containing personal data. In at least one embodiment, if the output of the target ML model is known to be personal data but some of the input features are unknown/unclassified, those unknown/unclassified features may also be marked as potentially containing personal data.

Figure 1:
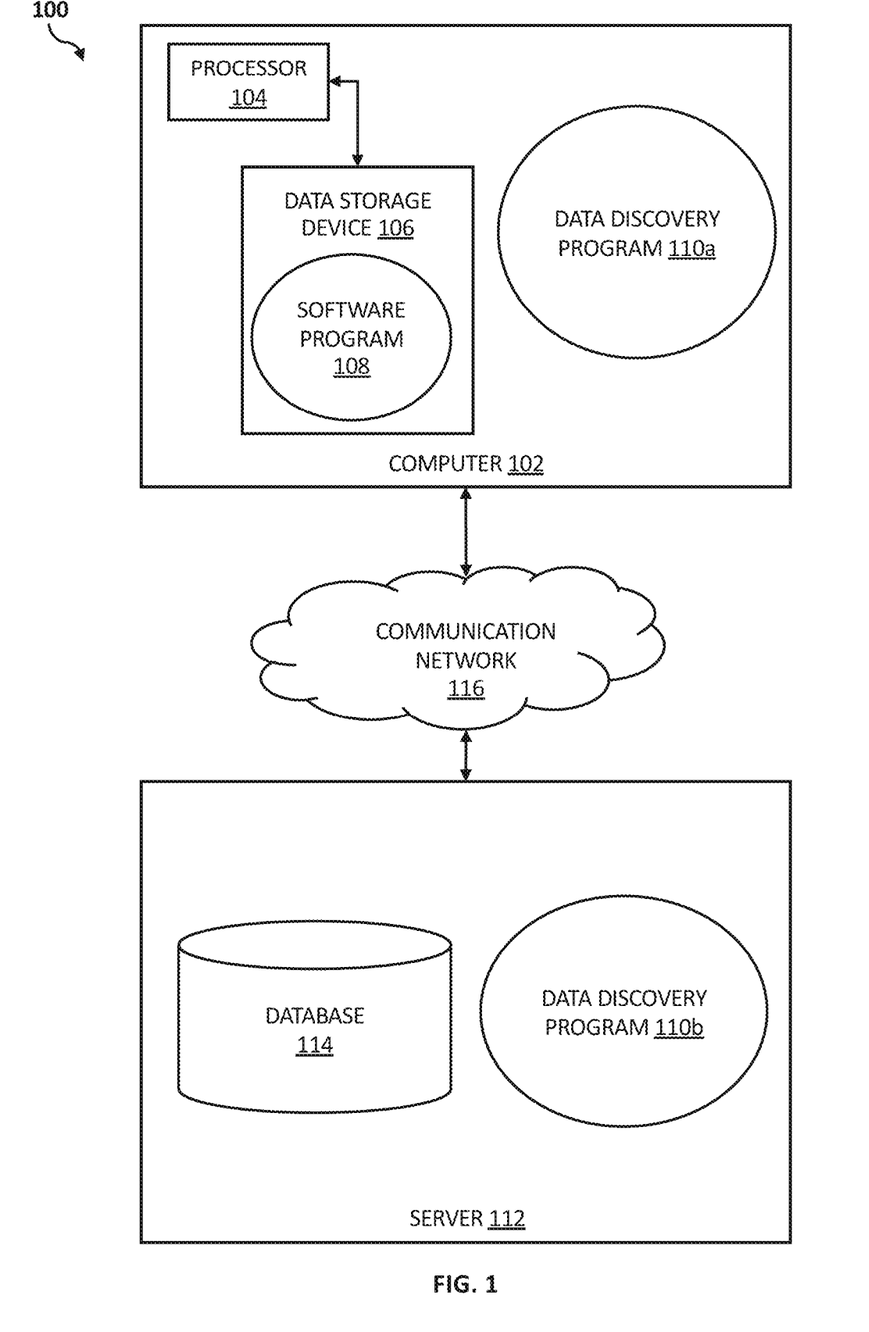
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a data discovery program 110a. The networked computer environment 100 may also include a server 112 that is enabled to run a data discovery program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the data discovery program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the data discovery program 110a, 110b (respectively) to discover personal data contained within ML models stored in an organization's system or data stores as part of an overall data discovery process. Embodiments of the present disclosure are explained in more detail below with respect to FIGS. 2 and 3.

Figure 2:
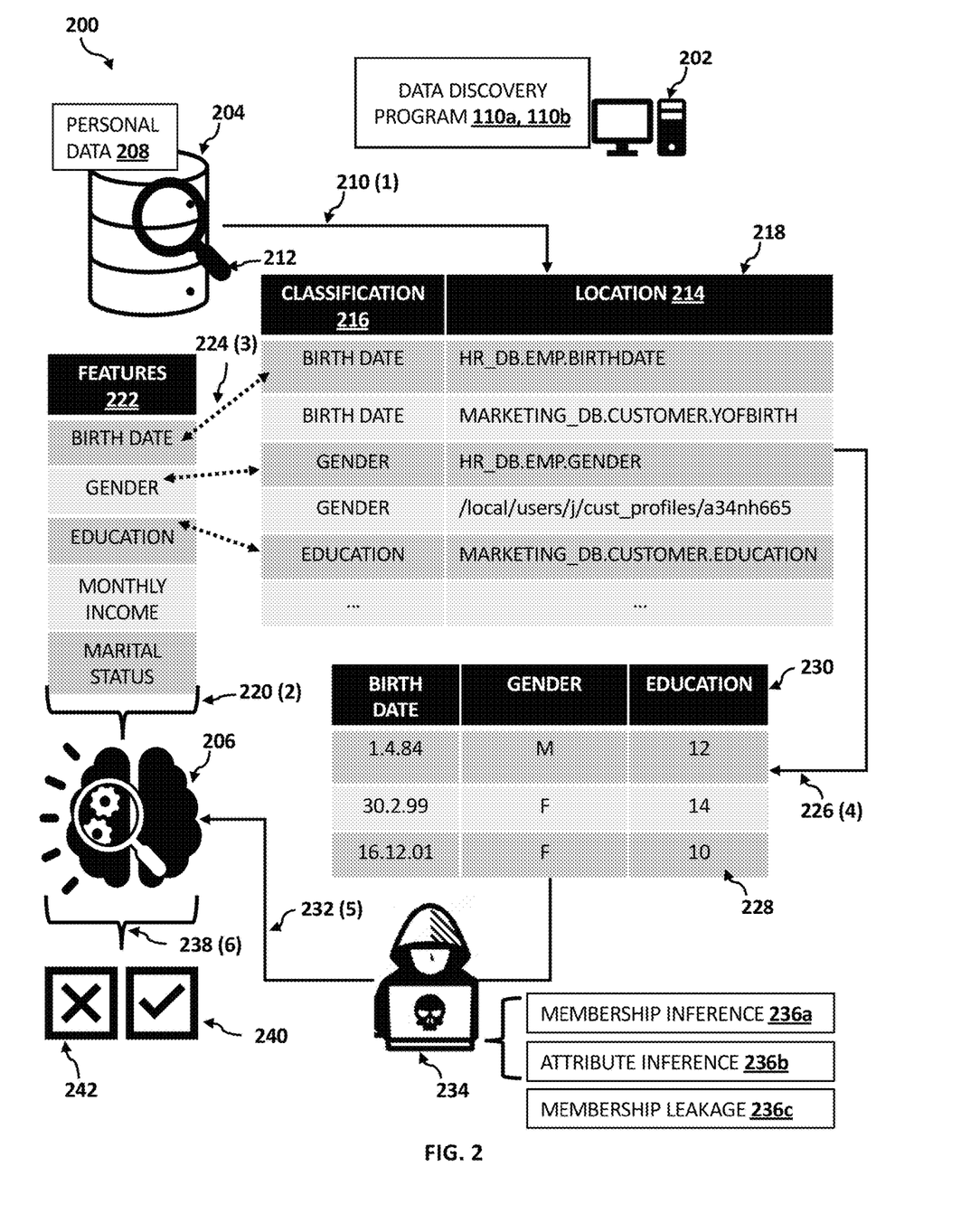
FIG. 2 is a schematic block diagram of a data processing environment according to at least one embodiment.

Referring now to FIG. 2, a schematic block diagram of a data processing environment 200 implementing the data discovery program 110a, 110b according to at least one embodiment is depicted. According to one embodiment, the data processing environment 200 may include one or more components (e.g., client computer 102; server computer 112; communication network 116) of the computer environment 100 discussed above with reference to FIG. 1.

According to one embodiment, the data processing environment 200 may include a computer system 202, a data store 204, and a target ML model 206. In various embodiments, the computer system 202 may include a workstation, a personal computing device, a laptop computer, a desktop computer, a thin-client terminal, a tablet computer, a smart telephone, a smart watch or other smart wearable, or other electronic devices.

According to one embodiment, computer system 202 may include a tangible storage device and a processor that is enabled to run the data discovery program 110a, 110b. In one embodiment, the data discovery program 110a, 110b may include a single computer program or multiple program modules or sets of instructions being executed by the processor of the computer system 202. The data discovery program 110a, 110b may include routines, objects, components, units, logic, data structures, and actions that may perform particular tasks or implement particular abstract data types. The data discovery program 110a, 110b may be practiced in distributed cloud computing environments where tasks may be performed by remote processing devices which may be linked through the communication network 116. In one embodiment, the data discovery program 110a, 110b may include program instructions that may be collectively stored on one or more computer-readable storage media.

According to one embodiment, an organization that collects and processes data regarding one or more natural persons may include personal data 208 stored in one or more data stores 204. According to various embodiments, the personal data 208 may include any information relating to an identified or identifiable natural person. In one embodiment, personal data 208 may include a direct or indirect identifier of a natural person, such as, for example, a name, an identification number, location data, or an online identifier. In some embodiments, personal data 208 may also include one or more factors specific to the physical, physiological, genetic, mental, economic, cultural or social identity of a natural person.

In various embodiments, the data store 204 may be distributed over multiple data storage devices (e.g., data storage device 106; database 114) included in one or more electronic devices (e.g., computer system 202) of the data processing environment 200, over multiple data storage devices (e.g., data storage device 106; database 114) external to the electronic devices (e.g., computer system 202) of the data processing environment 200, or a combination thereof. In other embodiments, data store 204 may be remote, such as on another server available via communication network 116. In one embodiment, data store 204 may include relational databases storing structured and unstructured data.

According to one embodiment, at event 1 (210), a user (e.g., an organization) may implement the data discovery program 110a, 110b to locate any personal data 208 stored in data store 204. During this initial phase, the data discovery program 110a, 110b may implement various data discovery tools 212 to mine the data store 204 (e.g., structured data, unstructured data, metadata) to identify one or more locations 214 of personal data 208 in the data store 204. In some embodiments, the data discovery tools 212 may include data discovery ML models (e.g., supervised or unsupervised learning models) which may be trained to identify personal data 208 based on learning the form of the personal data 208. According to one embodiment, the data discovery program 110a, 110b may implement the data discovery ML model to assign classifications 216 to the located personal data 208 based on the type of the personal data 208. According to one embodiment, the data discovery program 110a, 110b may map each classification 216 of personal data 208 to the different locations 214 in the data store 204 where the personal data 208 is stored. In at least one embodiment, the data discovery program 110a, 110b may generate a location classification table 218 or similar structured data document indicating locations 214 of the personal data 208 and the corresponding classifications 216 of the personal data 208 stored in those locations 214.

As previously described, data processing environment 200 may include the target ML model 206. In one embodiment, the target ML model 206 may include any ML model deployed by the user (e.g., organization). In various embodiments, data processing environment 200 may include multiple target ML models 206 as the user may deploy various ML models for various operational purposes. At event 2 (220), the data discovery program 110a, 110b may analyze each target ML model 206 to extract one or more ML features 222 used to train the target ML model 206. According to one embodiment, the data discovery program 110a, 110b may identify a file, metadata, and/or other description associated with the target ML model 206 including the features 222 used to train the target ML model 206.

According to one embodiment, at event 3 (224), the data discovery program 110a, 110b may map the ML features 222 to the locations 214 of the corresponding personal data 208. In one embodiment, the locations 214 (e.g., database columns/documents) of the personal data 208 associated with the ML features 222 may be determined by matching the ML features 222 with the classifications 216 of the personal data 208 determined at event 1 (210).

According to one embodiment, at event 4 (226), the data discovery program 110a, 110b may extract each data record 228 corresponding to the ML features 222 from the corresponding location 214 of the personal data 208. In one embodiment, the data discovery program 110a, 110b may generate a feature record table 230 linking the ML features 222 and the corresponding data records 228 for each feature 222.

According to one embodiment, at event 5 (232), the data discovery program 110a, 110b may implement one or more adversarial inference attacks 234 on the target ML model 206 using each of the data records 228. In one embodiment, the adversarial inference attacks 234 may determine whether potentially leakable personal data 208 is contained within the target ML model 206.

In at least one embodiment, the adversarial inference attack 234 may include a membership inference attack 236a. The membership inference attack 236a may be implemented by the data discovery program 110a, 110b to determine whether a given data record 228 was part of the training dataset of the target ML model 206. Each data record 228 may be fed into the target ML model 206 to obtain a prediction based on that input. In one embodiment, the membership inference attack 236a may use the data record 228 and the corresponding prediction from the target ML model 206 to determine a probability that the data record 228 was part of the training dataset for target ML model 206. In one embodiment, if the membership inference attack 236a determines that the data record 228 may have been a part of the training dataset for target ML model 206, at event 6 (238), the data discovery program 110a, 110b may assign a first label 240 indicating that the target ML model 206 contains personal data 208. In another embodiment, if the membership inference attack 236a determines that the data record 228 may not have been part of the training dataset for target ML model 206, at event 6 (238), the data discovery program 110a, 110b may assign a second label 242 indicating that the target ML model 206 does not contain personal data 208.

In another embodiment, the adversarial inference attack 234 may include an attribute inference attack 236b, which may also be referred to as a model inversion attack. According to one embodiment, the data discovery program 110a, 110b may implement the attribute inference attack 236b to determine whether the target ML model 206 leaks personal data 208. In one embodiment, the attribute inference attack 236b may feed one or more data records 228 into the target ML model 206 and receive an output classification and a corresponding confidence score. In one embodiment, the attribute inference attack 236b may exploit the confidence scores and the output classifications to predict the values of features (e.g., personal data) that may have been used to train the target ML model 206. For example, the attribute inference attach 236b may be implemented to discover unknown features about a person when that person's data (e.g., data record 228) is known to have been in the training dataset for the target ML model 206.

If the attribute inference attack 236b is successful at predicting additional personal data 208 associated with the data record 228, at event 6 (238), the data discovery program 110a, 110b may assign the first label 240 indicating that the target ML model 206 contains personal data 208. However, if the attribute inference attack 236b is not successful at predicting additional personal data 208 associated with the data record 228, at event 6 (238), the data discovery program 110a, 110b may assign the second label 242 indicating that the target ML model 206 does not contain personal data 208.

According to at least one embodiment, the data discovery program 110a, 110b may include measuring a membership leakage value 236c. In one embodiment, the membership leakage value 236c may quantify a risk of a successful membership inference attack 236a associated with a given data record 228 and the target ML model 206. According to one embodiment, if the data discovery program 110a, 110b determines that the target ML model 206 exhibits a high risk of membership leakage, then at event 6 (238), the data discovery program 110a, 110b may assign the first label 240 indicating that the target ML model 206 contains personal data 208. According to at least one embodiment, any membership leakage value 236c greater than a non-zero value may prompt the data discovery program 110a, 110 to assign the first label 240 indicating that the target ML model 206 contains personal data 208.

Figure 3:
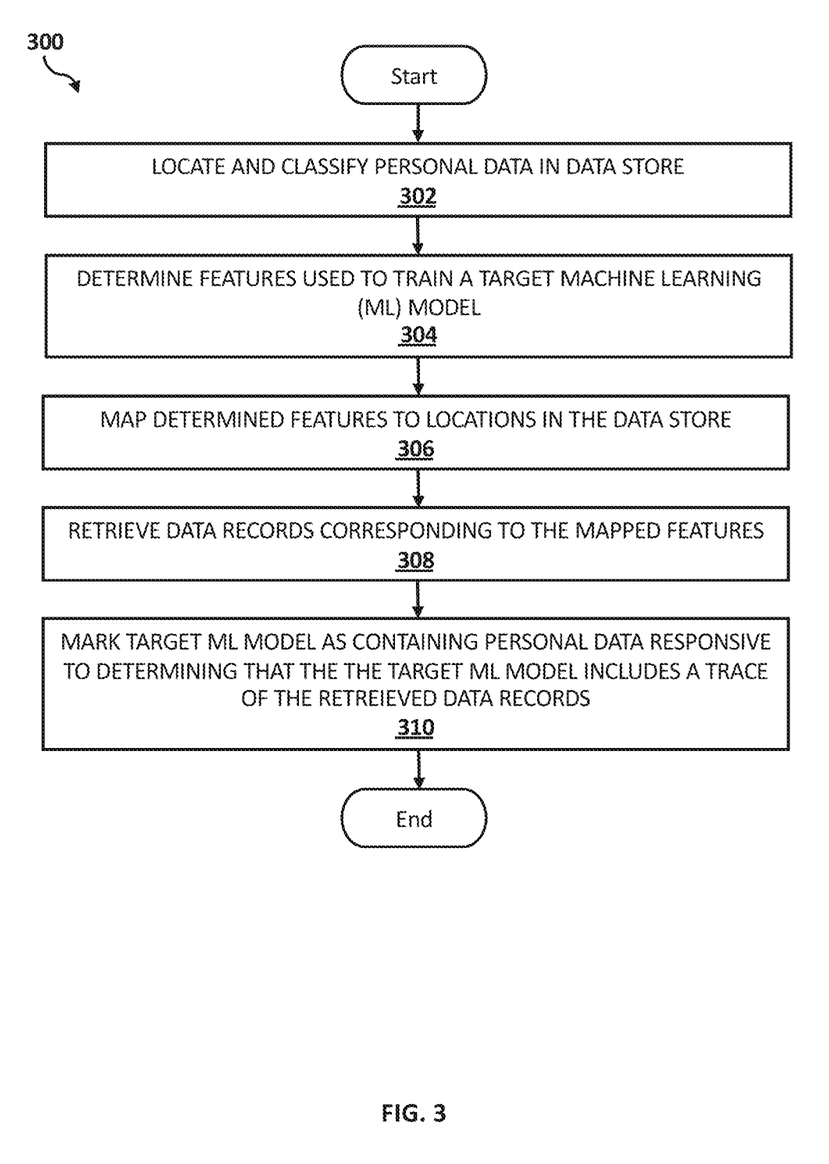
FIG. 3 is an operational flowchart illustrating a process for personal data discovery according to at least one embodiment.

Referring now to FIG. 3, an operational flowchart illustrating the exemplary personal data discovery process 300 used by the data discovery program 110a, 110b according to at least one embodiment is depicted.

At 302, personal data stored in a data store is located and classified. According to one embodiment, the data discovery program 110a, 110b may implement one or more data discovery tools to find the locations of personal data stored in various structured and unstructured data stores, as described previously with reference to FIG. 2. In one embodiment, the data discovery program 110a, 110b may analyze the stored data, as well as the metadata. In various embodiments, the data discovery program 110a, 110b may employ supervised or unsupervised ML learning techniques to determine the type and location of each personal data element. In one embodiment, the data discovery program 110a, 110b may generate a classification to indicate the personal data feature (e.g., birth date, gender, education) stored in each of the discovered location.

Then at 304, one or more features used to train a target ML model is determined. According to one embodiment, the data discovery program 110a, 110b may identify a file, metadata, and/or other description associated with the target ML model including one or more features that were used to train the target ML model.

Then at 306, the features determined from the target ML model are mapped to one or more locations in the data store. According to one embodiment, the data discovery program 110a, 110b may map the features to the locations of the corresponding personal data. As previously described with reference to FIG. 2, the locations storing the personal data may be classified based on the type of personal data stored therein. Accordingly, the locations of the personal data associated with the features may be determined by mapping the features to the classifications of the personal data determined at event 1 (210) of FIG. 2.

Then at 308, one or more data records corresponding to the mapped features are retrieved. According to one embodiment, the data discovery program 110a, 110b may extract each data record corresponding to the mapped features from the corresponding locations (e.g., documents; metadata) of the data store, as described previously with reference to FIG. 2.

Thereafter at 310, mark the target ML model as containing personal data responsive to determining that the target ML model includes a trace of the retrieved data records. According to one embodiment, the data discovery program 110a, 110b may implement one or more adversarial inference attacks (e.g., membership inference; attribute inference) and/or calculate membership leakage metrics to determine whether the target ML model contains traces and/or leaks information about the retrieved data records. In one embodiment, the data discovery program 110a, 110b may determine that the target ML model contains traces of the retrieved data records if some information (e.g., at least one portion) about the retrieved data records may be found in the target ML model using means such as, for example, the adversarial inference attacks and/or membership leakage metrics.

According to one embodiment, the data discovery program 110a, 110b may use each of the retrieved data records to attack the target ML model implementing one or more the adversarial inference attacks (e.g., membership inference; attribute inference). If the adversarial inference attacks are successful, as described previously with reference to FIG. 2, the data discovery program 110a, 110b may determine that the target ML model includes traces of the retrieved data records. As such, the data discovery program 110a, 110b may mark the target ML model as containing personal data.

In various embodiments, the data discovery program 110a, 110b may calculate membership leakage metrics to determine an amount of personal data contained within the target ML model. In one embodiment, if the data discovery program 110a, 110b determines that the target ML model includes a membership leakage value that is greater than zero, the data discovery program 110a, 110b may determine that the target ML model leaks personal data and may mark the target ML model as containing personal data. According to one embodiment, the data discovery program 110a, 110b may calculate membership leakage metrics without implementing the one or more adversarial inference attacks.

In addition to marking the target ML model as containing personal data, in one embodiment, the output of the target ML model (if it is also stored) may also be marked as containing personal data. For example, the target ML model may receive as inputs (e.g., retrieved data records), a person's age, gender, and income. In response, the target ML model may output whether the person should receive a loan. In one embodiment, the output of the target ML model (e.g., did the person receive a loan or not) may be stored back into the person's record/profile. Continuing with this example, during the initial data classification process, the data discovery program 110a, 110b may identify and classify age, gender, and income as personal data, but may not recognize/classify the "received loan" attribute/feature. In one embodiment, the data discovery program 110a, 110b may determine that the target ML model that decides whether a person receives a loan or not may be considered personal data. In this case, the data discovery program 110a, 110b may also determine that the output (e.g., "received loan") attribute contains potentially personal data.

In at least one embodiment, if the output of the target ML model is known to be personal data but some of the input features are unknown/unclassified, those unknown/unclassified features may also be marked as potentially containing personal data. Continuing with the previous example, the target ML model may receive an additional feature "credit score." In this case, during the initial data classification process, the data discovery program 110a, 110b may identify and classify age, gender, and income as personal data, but may not recognize/classify the "credit score" attribute (e.g., unclassified feature). In one embodiment, the data discovery program 110a, 110b may determine that the target ML model that decides whether a person receives a loan or not may be considered personal data. Now our process determines that the model that decides whether a person receives a loan or not should be considered personal data. In this case, the data discovery program 110a, 110b may also determine that the unclassified feature that is part of the target ML model's input is potentially personal data.

The data discovery program 110a, 110b may improve the functionality of a computer because the data discovery program 110a, 110b may enable a computer to discover personal data contained within target ML models stored in an organization's system or data stores as part of the overall data discovery process.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
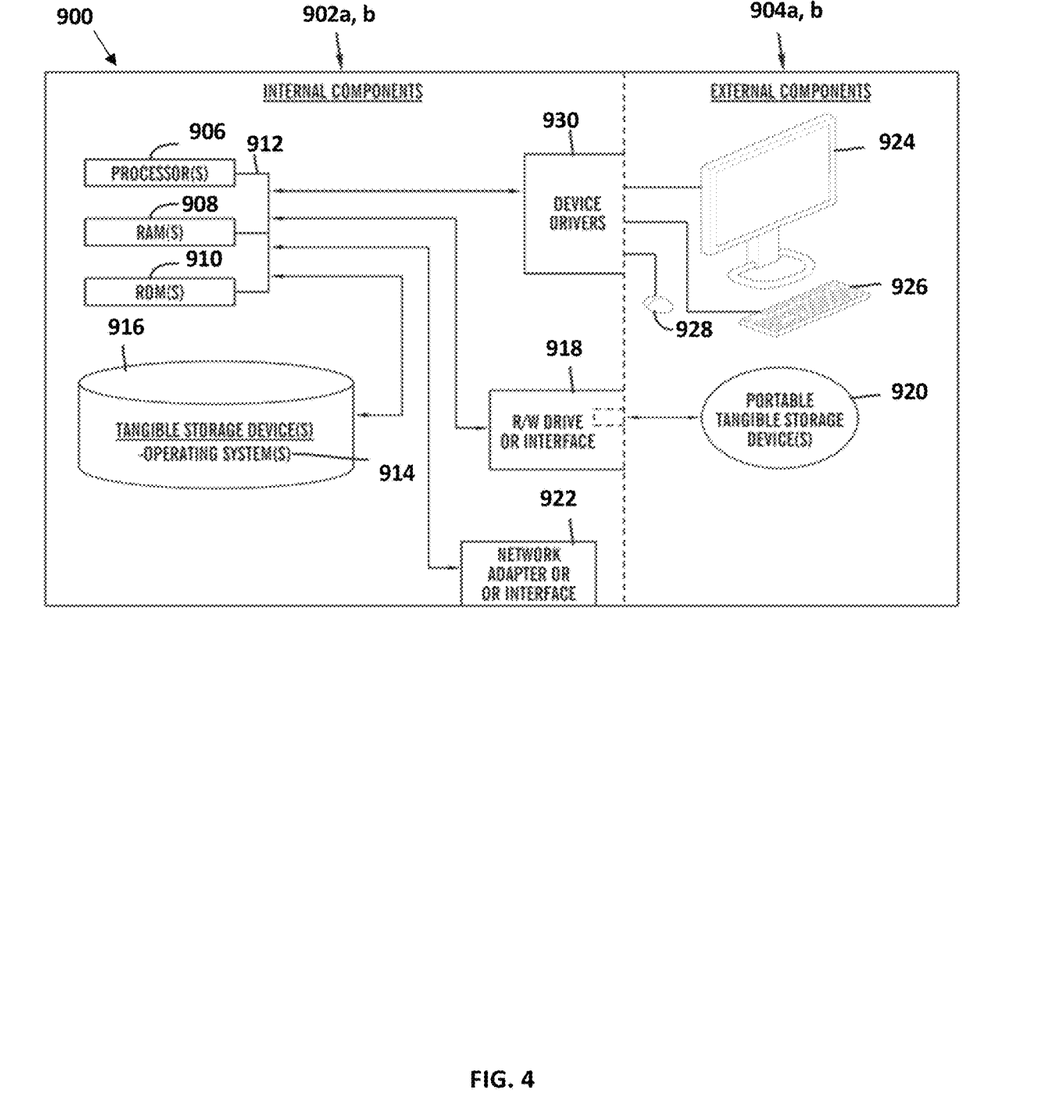
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the data discovery program 110a in client computer 102, and the data discovery program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the data discovery program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the data discovery program 110a in client computer 102 and the data discovery program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the data discovery program 110a in client computer 102 and the data discovery program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
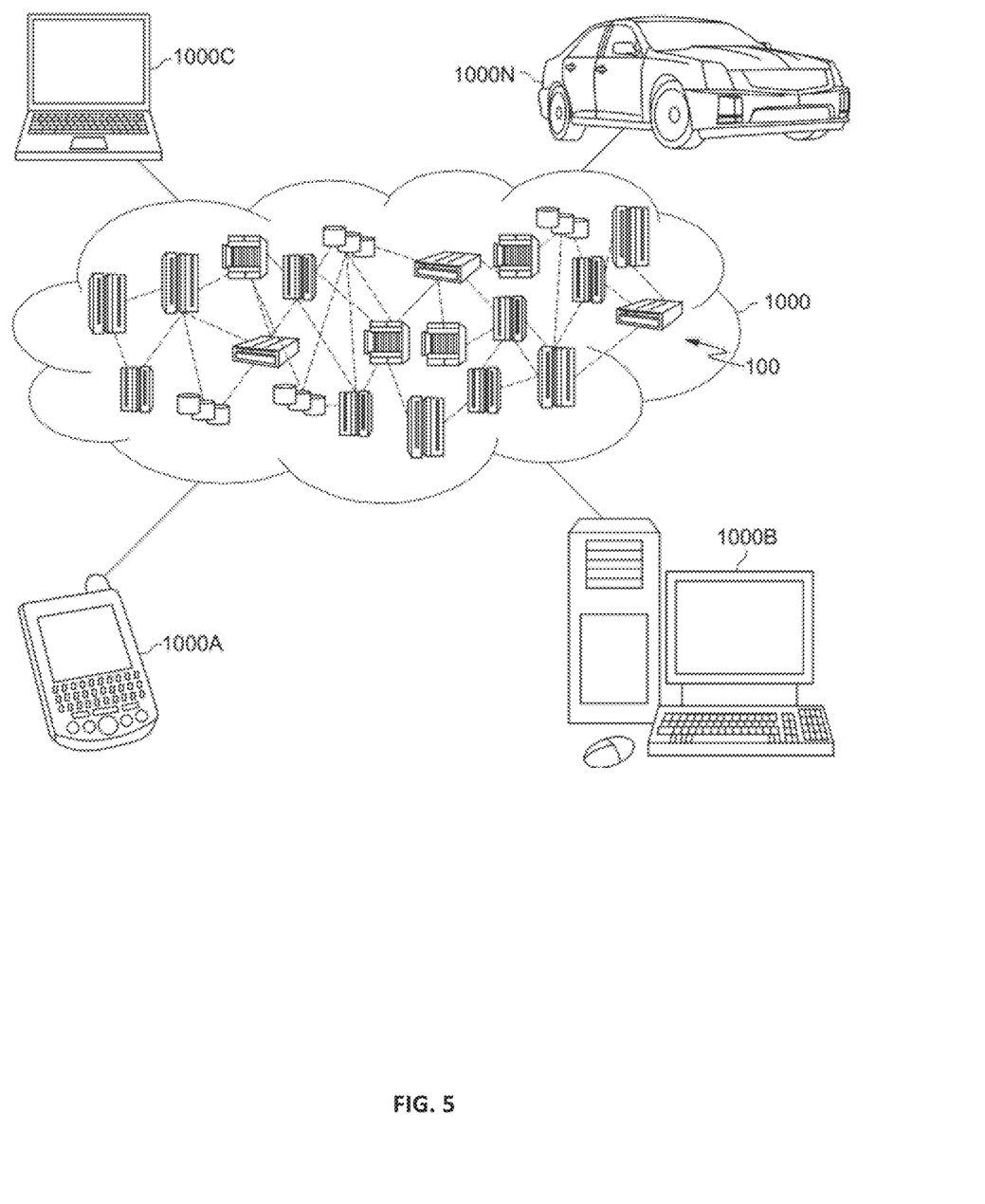
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
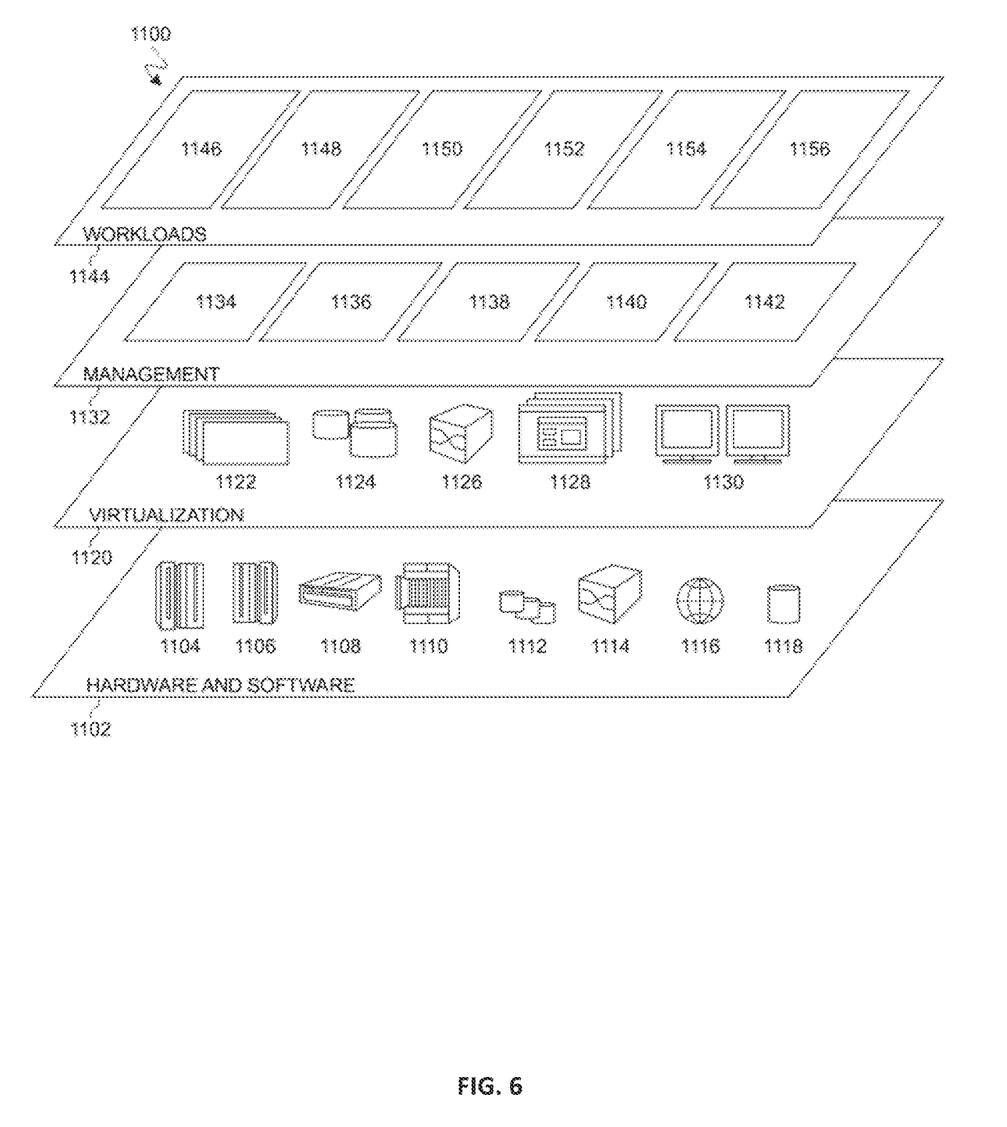
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and personal data discovery 1156. A data discovery program 110a, 110b provides a way to discover personal data contained within ML models stored in an organization's system or data stores as part of an overall data discovery process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for personal data discovery, the method comprising:
   determining at least one feature used to train a target machine learning (ML) model;
   mapping the determined at least one feature to at least one location of a data store including at least one personal data associated with the determined at least one feature;
   retrieving a data record of the at least one personal data associated with the mapped at least one feature from the at least one location of the data store;
   determining that the target ML model includes a trace of the retrieved data record; and
   marking the target ML model as containing the at least one personal data.

2. The method of claim 1, further comprising:
   applying a membership inference attack on the target ML model using the retrieved data record; and
   in response to the applied membership inference attack being successful on the target ML model, marking the target ML model as containing the at least one personal data.

3. The method of claim 1, further comprising:
   applying an attribute inference attack on the target ML model using the retrieved data record; and
   in response to the applied attribute inference attack being successful on the target ML model, marking the target ML model as containing the at least one personal data.

4. The method of claim 1, further comprising:
   calculating a membership leakage value to determine an amount of personal data contained within the target ML model; and
   in response to the calculated membership leakage value being greater than a non-zero value, marking the target ML model as containing the at least one personal data.

5. The method of claim 1, wherein the retrieved data record further comprises a personal data record.

6. The method of claim 1, wherein mapping the determined at least one feature to the at least one location of the data store including the at least one personal data associated with the determined at least one feature further comprises:
   classifying the at least one personal data based on a personal data type;
   generating a location classification table indicating a corresponding classification of the at least one personal data stored in a respective personal data location; and
   mapping the determined at least one feature to the respective personal data location based on the corresponding classification of the at least one personal data.

7. The method of claim 1, wherein marking the target ML model as containing the at least one personal data further comprises:
   determining that at least one output of the target ML model is stored in the data store; and
   marking the at least one output of the target ML model as potentially containing the at least one personal data.

8. The method of claim 7, further comprising:
   identifying at least one unclassified feature associated with the target ML model; and
   in response to determining that the at least one output of the target ML model is marked as potentially containing the at least one personal data, determining that the identified at least one unclassified feature is potentially associated with the at least one personal data.

9. A computer system for personal data discovery, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
   determining at least one feature used to train a target machine learning (ML) model;
   mapping the determined at least one feature to at least one location of a data store including at least one personal data associated with the determined at least one feature;
   retrieving a data record of the at least one personal data associated with the mapped at least one feature from the at least one location of the data store;
   determining that the target ML model includes a trace of the retrieved data record; and
   marking the target ML model as containing the at least one personal data.

10. The computer system of claim 9, further comprising:
    applying a membership inference attack on the target ML model using the retrieved data record; and
    in response to the applied membership inference attack being successful on the target ML model, marking the target ML model as containing the at least one personal data.

11. The computer system of claim 9, further comprising:
    applying an attribute inference attack on the target ML model using the retrieved data record; and
    in response to the applied attribute inference attack being successful on the target ML model, marking the target ML model as containing the at least one personal data.

12. The computer system of claim 9, further comprising:
    calculating a membership leakage value to determine an amount of personal data contained within the target ML model; and
    in response to the calculated membership leakage value being greater than a non-zero value, marking the target ML model as containing the at least one personal data.

13. The computer system of claim 9, wherein the retrieved data record further comprises a personal data record.

14. The computer system of claim 9, wherein mapping the determined at least one feature to the at least one location of the data store including the at least one personal data associated with the determined at least one feature further comprises:

classifying the at least one personal data based on a personal data type;

generating a location classification table indicating a corresponding classification of the at least one personal data stored in a respective personal data location; and     mapping the determined at least one feature to the respective personal data location based on the corresponding classification of the at least one personal data.

15. The computer system of claim 9, wherein marking the target ML model as containing the at least one personal data further comprises:

determining that at least one output of the target ML model is stored in the data store; and marking the at least one output of the target ML model as potentially containing the at least one personal data.

16. The computer system of claim 15, further comprising:

identifying at least one unclassified feature associated with the target ML model; and     in response to determining that the at least one output of the target ML model is marked as potentially containing the at least one personal data, determining that the identified at least one unclassified feature is potentially associated with the at least one personal data.

17. A computer program product for personal data discovery, comprising:

one or more computer-readable storage media and program instructions collectively stored on the one or more computer-readable storage media, the program instructions executable by a processor to cause the processor to perform a method comprising:

determining at least one feature used to train a target machine learning (ML) model;

mapping the determined at least one feature to at least one location of a data store including at least one personal data associated with the determined at least one feature;

retrieving a data record of the at least one personal data associated with the mapped at least one feature from the at least one location of the data store;

determining that the target ML model includes a trace of the retrieved data record; and         marking the target ML model as containing the at least one personal data.

18. The computer program product of claim 17, further comprising:

applying a membership inference attack on the target ML model using the retrieved data record; and     in response to the applied membership inference attack being successful on the target ML model, marking the target ML model as containing the at least one personal data.

19. The computer program product of claim 17, further comprising:

applying an attribute inference attack on the target ML model using the retrieved data record; and     in response to the applied attribute inference attack being successful on the target ML model, marking the target ML model as containing the at least one personal data.

20. The computer program product of claim 17, further comprising:

calculating a membership leakage value to determine an amount of personal data contained within the target ML model; and     in response to the calculated membership leakage value being greater than a non-zero value, marking the target ML model as containing the at least one personal data.

* * * * *